US012462688B2

(12) United States Patent
Jin et al.

(10) Patent No.: US 12,462,688 B2
(45) Date of Patent: Nov. 4, 2025

(54) PLATOONING OF COMMUNICATION DEVICES

(71) Applicant: Telefonaktiebolaget LM Ericsson (PUBL), Stockholm (SE)

(72) Inventors: Yifei Jin, Solna (SE); Vijaya Parampalli Yajnanarayana, Bangalore (IN); Aneta Vulgarakis Feljan, Stockholm (SE); Rafia Inam, Västerås (SE); Alexandros Nikou, Danderyd (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 271 days.

(21) Appl. No.: 18/247,288

(22) PCT Filed: Oct. 7, 2020

(86) PCT No.: PCT/EP2020/078182
§ 371 (c)(1),
(2) Date: Mar. 30, 2023

(87) PCT Pub. No.: WO2022/073607
PCT Pub. Date: Apr. 14, 2022

(65) Prior Publication Data
US 2024/0005798 A1     Jan. 4, 2024

(51) Int. Cl.
*G08G 1/00*     (2006.01)
*H04W 4/02*     (2018.01)
*H04W 4/40*     (2018.01)

(52) U.S. Cl.
CPC .............. *G08G 1/22* (2013.01); *H04W 4/025* (2013.01); *H04W 4/40* (2018.02)

(58) Field of Classification Search
CPC .......... G08G 1/22; H04W 4/025; H04W 4/40; H04W 8/08; H04W 36/0009;
(Continued)

(56) References Cited

U.S. PATENT DOCUMENTS 11,910,408 B2 * 2/2024 Wang ..................... H04W 72/23
12,082,163 B2 * 9/2024 Lee ........................ H04W 72/02
(Continued)

FOREIGN PATENT DOCUMENTS

WO   WO-2021185960 A1 *   9/2021   .............. H04W 4/08
WO      2021228374 A1      11/2021

OTHER PUBLICATIONS

3GPP TS 23.273 V16.3.0 (Mar. 2020); 3rd Generation Partnership Project; Technical Specification Group Services and System Aspects; 5G System (5GS) Location Services (LCS); Stage 2 (Release 16).
(Continued)

*Primary Examiner* — Richard M Camby
(74) *Attorney, Agent, or Firm* — Baker Botts L.L.P.

(57) ABSTRACT

A method, in a first network function, for providing one or more platoon recommendations for platooning of a plurality of communication devices the method comprising: obtaining mobility information for the plurality of communication devices; determining, based on the mobility information, a platoon recommendation comprising a subset of the plurality of communication devices to be grouped into a platoon and a head communication device of the subset of communication devices to be responsible for reporting reference signal measurements on behalf of the platoon; and transmitting the platoon recommendation to a second network function.

12 Claims, 14 Drawing Sheets

(58) Field of Classification Search
CPC ............ H04W 52/0212; H04W 64/00; H04W 84/005; Y02D 30/70
See application file for complete search history.

(56) References Cited

U.S. PATENT DOCUMENTS

| | | | |
|---|---|---|---|
| 12,087,168 B2* | 9/2024 | Yoo | G08G 1/091 |
| 2017/0289864 A1* | 10/2017 | Narasimha | H04W 36/0009 |
| 2020/0184827 A1 | 6/2020 | Park et al. | |
| 2021/0084441 A1* | 3/2021 | Zhou | H04W 72/23 |

OTHER PUBLICATIONS

Md. Noor-A-Rahim et al. "A Survey on Resource Allocation in Vehicular Networks"—Sep. 30, 2019.

Zhichun Wang et al., College of Information Science and Technique, "Cross-lingual Knowledge Graph Alignment via Graph Convolutional Networks", Proceedings of the 2018 Conference on Empirical Methods in Natural Language Processing, pp. 349-357, Brussels, Belgium, Oct. 31-Nov. 4, 2018.

PCT Notification of Transmittal of the International Search Report and the Written Opinion of the International Searching Authority, or the Declaration issued for International Application No. PCT/EP2020/078182—Aug. 30, 2021.

\* cited by examiner

PLATOONING OF COMMUNICATION DEVICES

PRIORITY

This nonprovisional application is a U.S. National Stage Filing under 35 U.S.C. § 371 of International Patent Application Serial No. PCT/EP2020/078182 filed Oct. 7, 2020 and entitled "PLATOONING OF COMMUNICATION DEVICES" which is hereby incorporated by reference in its entirety.

TECHNICAL FIELD

Embodiments of the present disclosure relate to platooning, and particularly provide methods, apparatus and machine-readable mediums for configuring communication devices for platooning.

BACKGROUND

Communication devices such as terminals are also known as e.g. User Equipments (UEs), wireless devices, mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network. Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

Vehicle platooning refers to the grouping of vehicles on roads and other transport mediums in order to increase traffic efficiency, reduce fuel consumption and emissions for vehicles in the platoon due to reduced aerodynamic drag, to combat driving stress, and to reduce traffic congestions. A vehicle platoon may be understood as a group of vehicles moving in the same direction, for example driving in the same driving lane one behind the other, preferably with no other vehicles in-between. Vehicle platooning is generally considered a specific use case in vehicle to everything (V2X) communication in intelligent transport systems (ITS) as described in *A Survey on Resource Allocation in Vehicle Networks*, Liu Z, Lee H, Ali G G, et al., arXiv:1909.13587, 2019.

SUMMARY

Vehicle platooning relies on knowing mobility information of vehicles to be platooned. This can be aided by the use of communication devices located in each vehicle, which can provide mobility information, such as availability, area, location and motion of the vehicle in a radio area network. However, the continuous transmission of channel information from multiple communication devices via the RAN can lead to excess power usage in the communication devices and bandwidth issues in the network.

It is an aim of the present disclosure to provide methods, a system, a node and a computer readable medium which at least partially address one or more of the challenges discussed above.

According to a first aspect of the disclosure, there is provided a method, in a first network function, for providing one or more platoon recommendations for platooning of a plurality of communication devices. The method comprises obtaining mobility information for the plurality of communication devices. The method further comprises determining, based on the mobility information, a platoon recommendation. The platoon recommendation comprises a subset of the plurality of communication devices to be grouped into a platoon and a head communication device of the subset of communication devices to be responsible for reporting reference signal measurements on behalf of the platoon. The method further comprises transmitting the platoon recommendation to a second network function.

The mobility information comprises one or more of: a) an availability of the communication device; b) a motion of the communication device; c) a location of the communication device; d) a serving area of the communication device.

The reference signal measurements may comprise one or more of sounding reference signals (SRS), demodulation reference signals (DMRS) and cell-specific reference signals (CRS).

Determining the platoon recommendation may comprise determining an alignment between respective pairs of the plurality of communication devices based on their respective mobility information.

The mobility information for each of the two or more of the plurality of communication devices may be obtained in a knowledge graph. Each vertex of the knowledge graph may represents one of the plurality of communication devices. In some embodiment, mobility information for each of the plurality of communication devices is aggregated as one or more weights of the respective vertex. For example, mobility information may weight the edge connecting a respective vertex. For example, the mobility vertex may include a Boolean value representing the presence of a communication device in a geographical region. For example, an edge may be encoded with one or more temporal features, such as a periodic location or a lifetime of the presence of the respective communication device.

Determining the alignment between each of the pairs of the plurality of communication devices may comprise providing each knowledge graph to a graph convolution network (GCN). In some embodiments, the alignment between each of the pairs of the plurality of UEs may be determined using cosine thresholding.

Determining the indication of the head communication device may comprise: determining a pair of the pairs of the plurality of communication devices having the closest alignment; and selecting one of the pair of the pairs having the closest alignment to be the head communication device.

The method may further comprise determining an estimated lifetime of the platoon based on the mobility information. The platoon recommendation comprises the estimated lifetime of the platoon.

The method may further comprise receiving a de-registration notification comprising an identifier for one or more of the subset of communication devices to be removed from the platoon recommendation; updating the platoon recommendation to remove the one or more of the subset of communication devices; and transmitting the updated platoon recommendation to the second network function.

One or more of the plurality of communication devices may be a user equipment (UE) such as an onboard unit (OBU) of a vehicle.

According to another aspect of the disclosure, there is provided a network function for providing one or more platoon recommendations for platooning of a plurality of communication devices. The network function comprises processing circuitry, and a memory coupled to the processing circuitry and comprising computer readable program instructions that, when executed by the processing circuitry, cause the network function to perform the method described above.

According to another aspect of the disclosure, there is provided a method, in a communication device, for reporting reference signal measurements on behalf of a platoon comprising the communication device and a plurality of participant communication devices. The method comprises receiving a platoon notification comprising an identifier for each of the plurality of participant communication devices and mobility information for the plurality of participant communication devices. The method further comprises performing the reference signal measurements on behalf of the platoon. The method further comprises reporting the reference signal measurements to a network node.

Reporting the reference signal measurements may comprise reporting a distance between the communication device and each of the participant communication devices.

The method may further comprise determining the distance between the communication device and each of the participant communication devices. This may comprise: obtaining a position of each of the participant communication devices; and determining the distance based on the position of the communication device and the respective position of each of the participant communication devices. The position of each of the participant communication devices may be received from one or more base stations. Additionally or alternatively, the position of each of the participant communication devices may be received directly from each of the participant communication devices.

The platoon notification may comprise a request for the communication device to report the reference signal measurements.

The network node may be a serving mobile location centre, SMLC, or a serving base station.

The method may further comprise monitoring an availability status of each of the participant communication devices in the platoon through direct communication with each of the participant communication devices.

The method may further comprise, on determining that one or more of the participant communication devices is unavailable based on the availability status, transmitting a deregistration signal to deregister the one or more of the participant communication devices from the platoon.

The method may further comprise receiving an updated platoon notification in response to deregistration of the one or more of the participant communication devices from the platoon.

The platoon notification may further comprise a platoon lifetime. In which case, the method may be performed over the platoon lifetime.

The identifier may be an international mobile subscriber identity, IMSI, number or similar unique identifier.

According to a further aspect of the disclosure, there is provided a communication device for reporting reference signal measurements on behalf of a platoon. The platoon comprises the communication device and a plurality of participant communication devices. The communication device comprises processing circuitry; and a memory coupled to the processing circuitry and comprising computer readable program instructions that, when executed by the processing circuitry, cause the network function to perform the method described above.

According to a further aspect of the disclosure, there is provided a method, in a communication device. The method comprises receiving a platoon notification. The platoon notification comprises an invitation to join a platoon comprising a head communication device. The platoon notification further comprises an identifier of the head communication device and mobility information for the head communication device. The method further comprises, responsive to the platoon notification, refraining from reporting reference signal measurements.

The method may further comprise transmitting a position of the communication device to the head communication device for determining a distance between the communication device and the head communication device.

The method may further comprise transmitting an availability status of the communication device to the head communication device.

The position and/or the availability status of the communication device may be transmitted to the head communication device directly, for example via a PC5 interface.

The platoon notification may further comprises a platoon lifetime. In which case, the method may be performed over the platoon lifetime.

The identifier is an international mobile subscriber identity, IMSI, number or similar unique identifier.

The method may further comprise, responsive to the platoon notification, transmitting a refrain notification to a network node. The refrain notification may notify the network node or other node that the communication device is refraining from reporting reference signal measurements.

The platoon may comprise one or more other communication devices.

One or more of the communication devices may be a user equipment, such as an onboard unit, OBU, for example of a vehicle.

According to a further aspect of the disclosure, there is provided a communication device. The communication device comprises processing circuitry; and a memory coupled to the processing circuitry and comprising computer readable program instructions that, when executed by the processing circuitry, cause the network function to perform the method described above.

According to a further aspect of the disclosure, there is provided a non-transitory machine-readable storage medium having instruction stored thereon which, when executed by a processor of an apparatus, cause the apparatus to perform any one of the methods described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
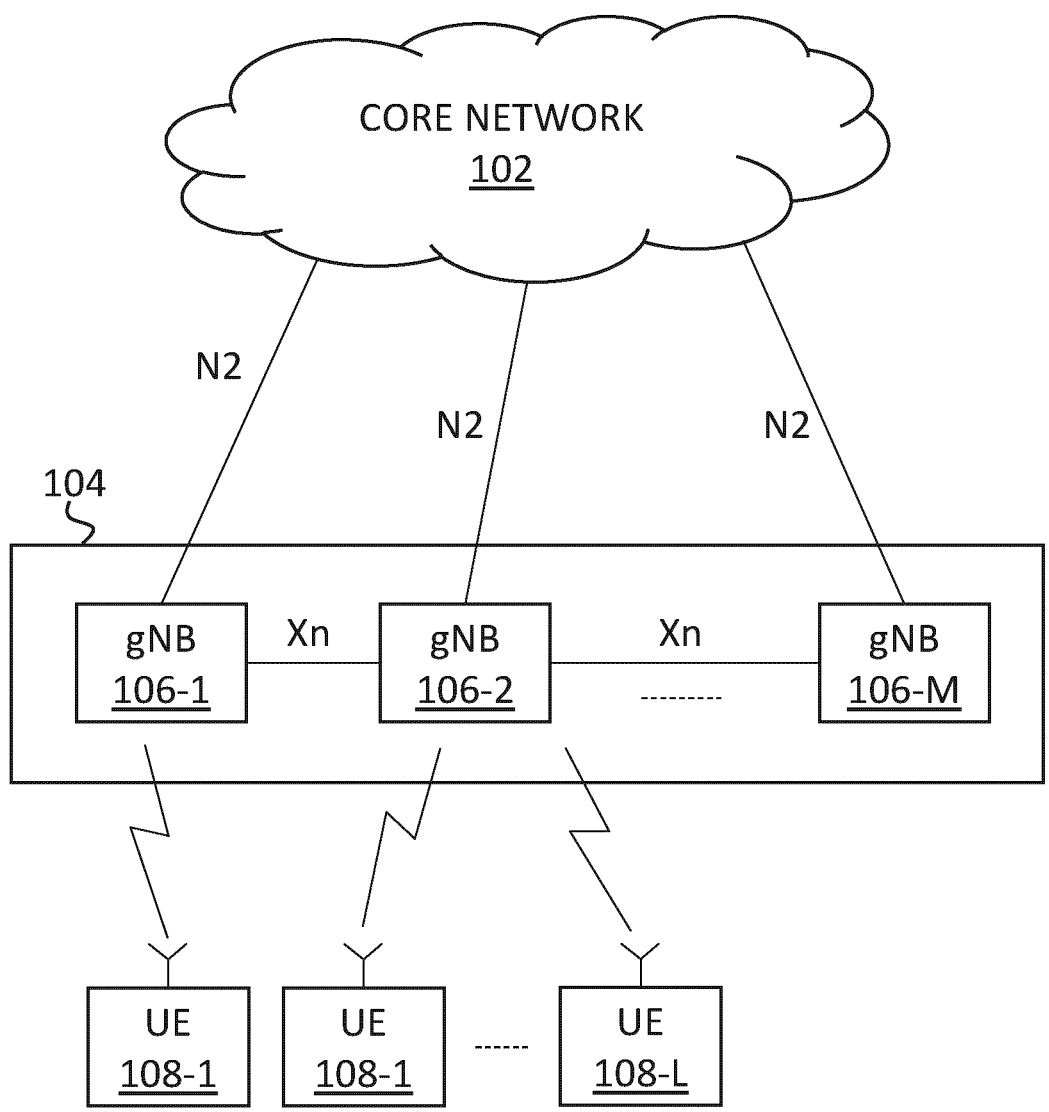
FIG. 1 is a block diagram of a radio area network.

FIG. 1 is a simplified diagram of a radio area network 104 which covers a geographical area divided into cell areas and comprises a plurality of base stations (BS) 106 connected to a core network 102 via a network interface (N2). Each cell area is served by one of the base stations 106. The base station or radio base station (RBS) may sometime be referred to as e.g. "gNB", "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. Each base station 106 communicates over the air interface operating on radio frequencies with the communication devices or UEs 108 within range of the base stations. Handover of UEs 108 between base stations 106 is performed over a handover interface (Xn).

Figure 2:
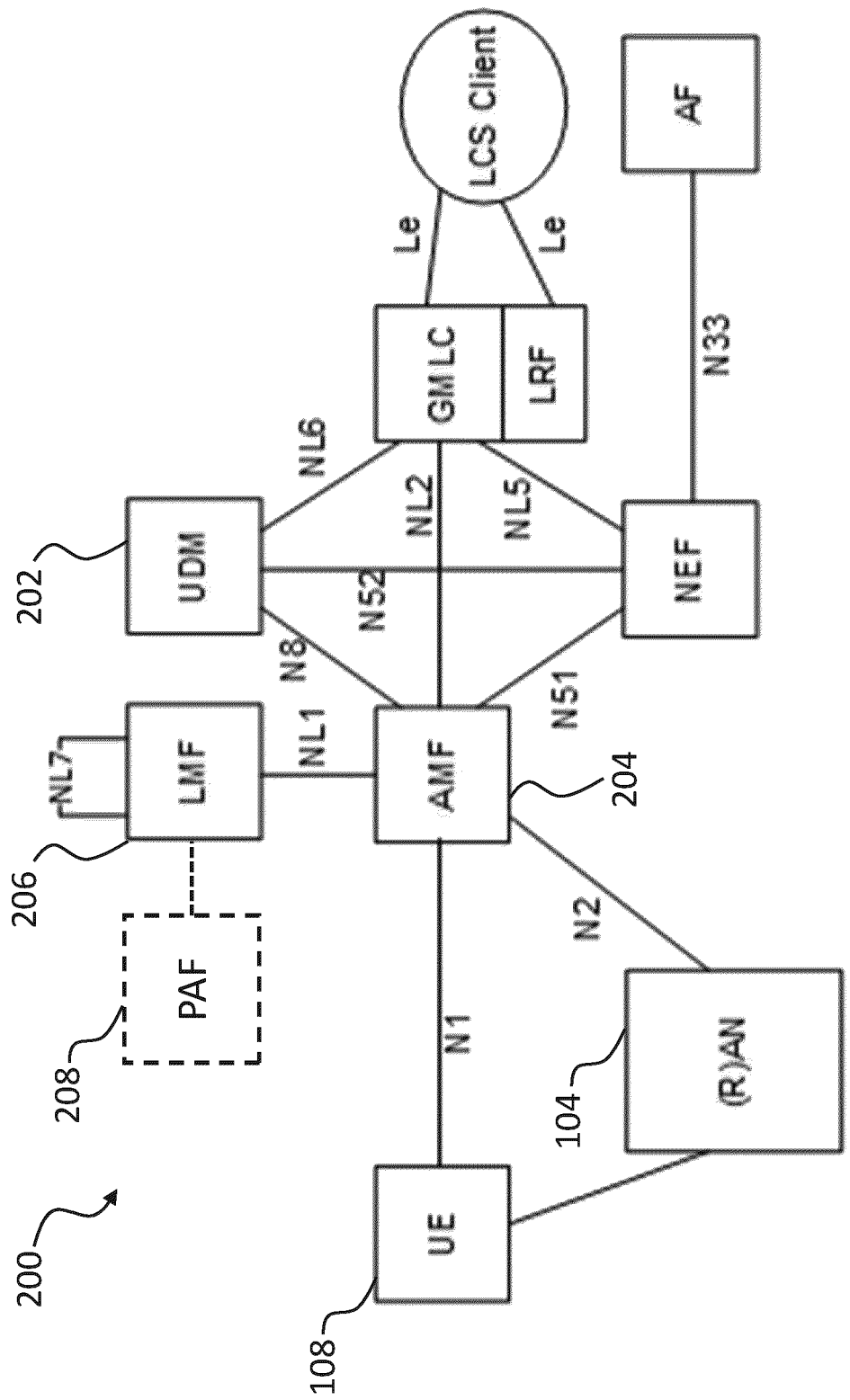
FIG. 2 is a block diagram of a fifth generation (5G) service based architecture modified in accordance with embodiments of the present disclosure.

FIG. 2 is a block diagram of a modified 5G network architecture 200 or service based architecture (SBA) which incorporates the radio area network 104 shown in FIG. 1. For simplicity only the relevant network functions (NFs) referred to in the description below are outlined here. For simplicity only a single instance of each network function, and UE 108 are shown. It will be appreciated that multiple instances of each network function may exist and multiple UEs 108 may be incorporated into the SBA 200.

Access authorization, user registration and data network profiles may be managed by a unified data management (UDM) function 202 which may be configured to store data including privacy legislation for the UE 108 along with subscription information.

Mobility information is managed by an access and mobility function (AMF) 202 and a location management function (LMF) 204.

The AMF 204 receives all connection and session related information from the UE 108 and is responsible for handling connection and mobility management tasks, including the management of handover of the UE 108 between base stations (gNBs) 106. The AMF 204 monitors channel information (signal strength of uplink/downlink) which is routinely reported by the UE 108.

The LMF 206 supports location determination for the UE, obtains downlink location measurements or location estimates from the UE, and obtains uplink location measurements from the base station 106. Information related to location services (LCS) is stored in the LMF 206. The measurements obtained by the LMF 206 may be received directly, e.g. from the base station 106, or may be received or obtained indirectly via other network functions in the core network 102 or by other means in the network.

Conventionally, to support the AMF 204 and LMF 206, each UE 108 is required to routinely report its channel sounding (CS) information to the core network 102, which requires substantially continuous transmission of measurement information, including sounding reference signals (SRS) on the uplink and cell-specific reference signals (CRS) on the downlink. The transmission of such information requires substantial bandwidth and power, as well the allocation of physical resources.

Figure 3:
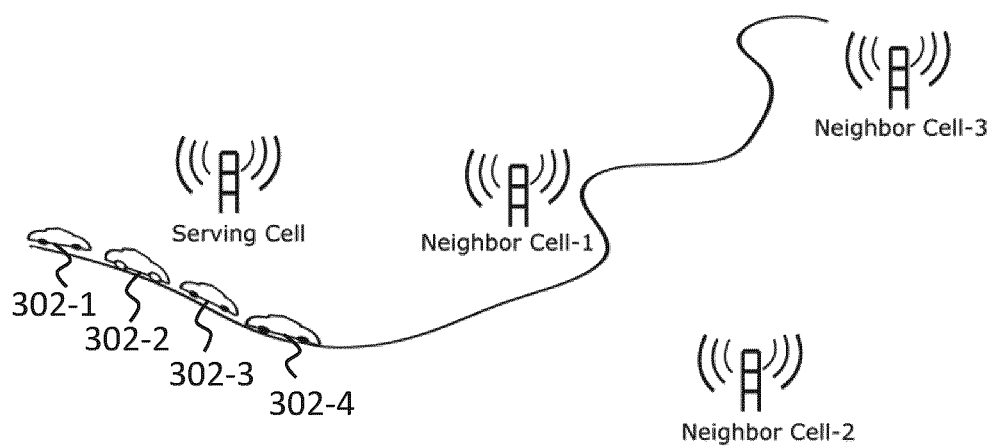
FIG. 3 is a diagram showing a plurality of vehicles travelling through the radio area network of FIG. 1.

As noted above, vehicle platooning relies on knowing mobility information of vehicles to be platooned. FIG. 3 illustrates a group of vehicles 302 each comprising a UE (not shown) positioned in each vehicle travelling along a road 304. The CS measurement for mobility information are conventionally performed by all the vehicles 302 in the platoon. This results in excessive energy consumption by the UEs provided in the vehicles 302. Also, these measurements are reported in the uplink (UL) which consumes UL bandwidth.

The inventors have realised, that CS information of nearby UEs, especially those comprised in vehicles travelling in the same direction at the same speed and close to one another, is very similar.

Embodiments of the present disclosure aim to advantageously reduce the excessive measurement and reporting of CS information associated with platooned vehicles. Furthermore, the advantageous optimization of signalling described in embodiments of the present disclosure aims to save excessive information exchange and optimize radio performance as well as energy consumption. A reduction in measurement reporting by UEs for the purpose of positioning may result in savings in energy needed for performing the measurements, as well as savings in UL bandwidth for reporting those measurements. Additionally, embodiments of the present disclosure aim to advantageously secure sensitive information associated with UEs in the network. Embodiments advantageously aim to grant the network the ability to identify hidden and/or existing platoons without leveraging privacy information (e.g. mobility access points, identifiers (IMSI) etc.) of UEs in those platoons to external application servers (e.g. route planning services) outside of the core network 102. Embodiments of the present disclosure may make further savings in information exchange associated with authorisation signalling, for example between network element functions (NEFs) granted to application functions (AFs) of platoon management services, and location privacy indicators (LPIs) stored in usage detail records (UDRs).

Additionally, embodiments of the present disclosure may advantageously exploit the dynamics of platoons, strategies for, provisioning and performing handover optimization described herein may result in a more optimized network. For example, when UEs conventionally move in platoon formations, all the UEs in the platoon will experience handovers simultaneously to the target base station. This can result in a sudden surge in load on resources for the target base-station. Such problems may be at least partly addressed by embodiments of the present disclosure. As will be described in more detail below, by analysing dynamics of the platoon as a while and from measurements received from the head-UE, the trajectory of the platoon can be estimated to obtain a platoon lifetime which may be used for provisioning base stations with the resources required for handover.

Embodiments of the present disclosure operate to group nearby UEs into a platoon based on their mobility (e.g. position, velocity, direction etc.) and nominate one of the platooned UEs (a 'head UE') to be responsible for reporting CS information on behalf of the platoon. The head UE can communication with other ('participant') UEs to confirm their availability to participate in the platoon and their distance from the head UE, as will be described in more detail below. In doing so, overall CS measurement is reduced since fewer measurement can be made on behalf of the platoon, resulting in energy savings in each participant UE. Additionally, measurement reporting is reduced since it need only to be performed by the head UE, resulting in a reduction in bandwidth required for reporting.

Referring again to FIG. 2, the above proposed functionality may be implemented with the aid of a new network function, a platoon agent function (PAF) 208 provided in the core network 102. The PAF 208 may be configured interface with the LMF 206 to extract LCS information, with the AMF 204 to exchange mobility information, and optionally with the UDM function 202 to extract privacy and subscription information for the UE 108. The new network function, the PAF 208 may also be referred to herein as a first network function. In some embodiments, the PAF 208 may be implemented as multiple network functions. Additionally or alternatively, one or more functions of the PAF 208 may be implemented in one or more other network functions, such as the AMF 204 or the LMF 206 without departing from the scope of the present disclosure.

Figure 4:
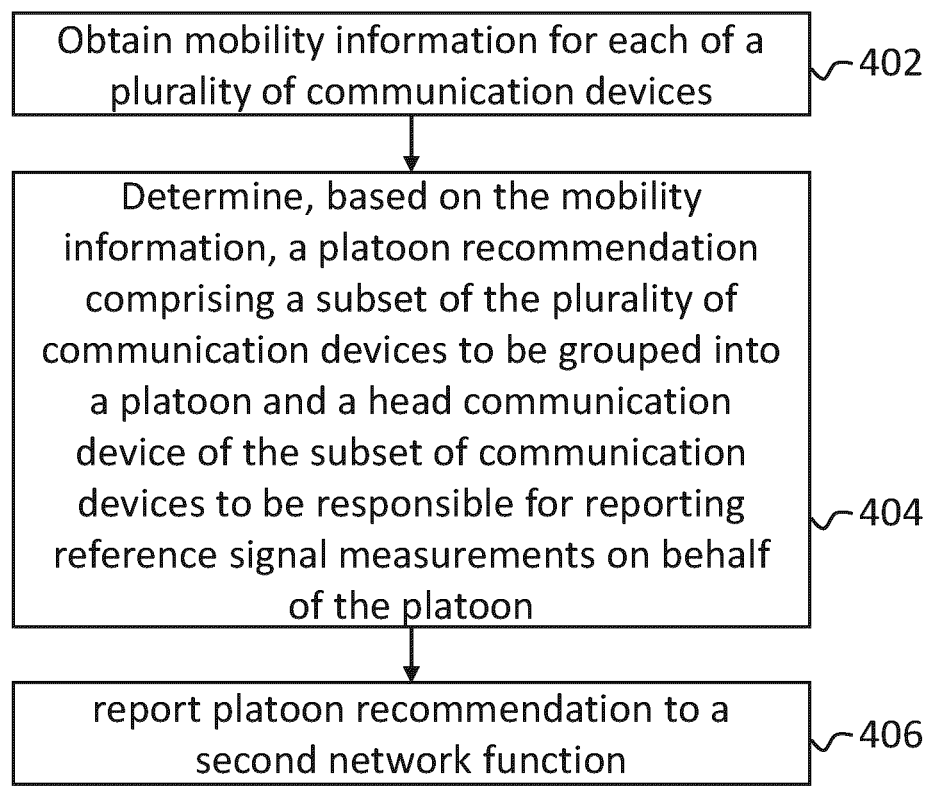
FIG. 4 illustrates a method according to embodiments of the present disclosure.

FIG. 4 illustrates a method for providing platoon recommendations for platooning a plurality of communication devices, such as the UEs 108 shown in FIG. 1. For example, the UEs 108 may each be provided in a vehicle such as the vehicles 302 shown in FIG. 3. The method may be implemented by the PAF 208, the AMF 204, the LMF206 or a combination thereof, but will be described below for simplicity as being implemented by the PAF 208.

At step 402, the PAF 208 may obtain mobility information for the plurality of UEs 108. Such information may comprise an availability of one or more of the UEs 108, for example for participating in a platoon. Such information may comprise motion information for one or more of the UEs 108, for example an indication of the direction and speed of travel of one or more of the UEs 108. Such information may comprise location information for one or more of the UEs 108. Such information may comprise serving area information denoting a serving or cell area in which one or more of the UEs 108 is located. Mobility information may be obtained from the LMF 206 which may in turn obtain such information from one or more of the UEs 108. The obtaining may comprise receiving the information directly from the LMF 206 and/or receiving information indirectly, for example via means other than the LMF 206. For example, the mobility information may be available locally to the PAF 208. For example, the mobility information may be obtained by the PAF 208 directly from the UEs 108. For example, the mobility information may be obtained by the PAF 208 via network functions other than the LMF 206.

At step 404, based on the mobility information obtained at step 402, the PAF 208 may determine a platoon recommendation. The recommendation may indicate a subset of the plurality of UEs to be grouped into a platoon. For example, the PAF 208 may determine an alignment of mobility of the subset of the plurality of UEs indicating that those UEs are travelling together and are thus good candidates for platooning. The platoon recommendation may further indicate a head UE of the subset of UEs. The head UE may be responsible reporting reference signal measurements on behalf of the platoon. For example, the head UE may be responsible for reporting CS measurements on behalf of the platoon. The head UE may also be responsible for performing CS measurements on behalf the platoon.406. The PAF 208 may then transmit the platoon recommendation to another network function, such as to the LMF 206 of the AMF 204.

The PAF 208 may also obtain or determine an estimate of the lifetime of the platoon which may be dependent on the LCS information retrieved from the LMF 206. For example the periodic location and area information may be used to produce the estimate of the lifetime of the platoon. Such information may be used to determine a trajectory of the platoon which may be used for provisioning base stations with the resources required for handover of platoons between cell areas.

Figure 5:
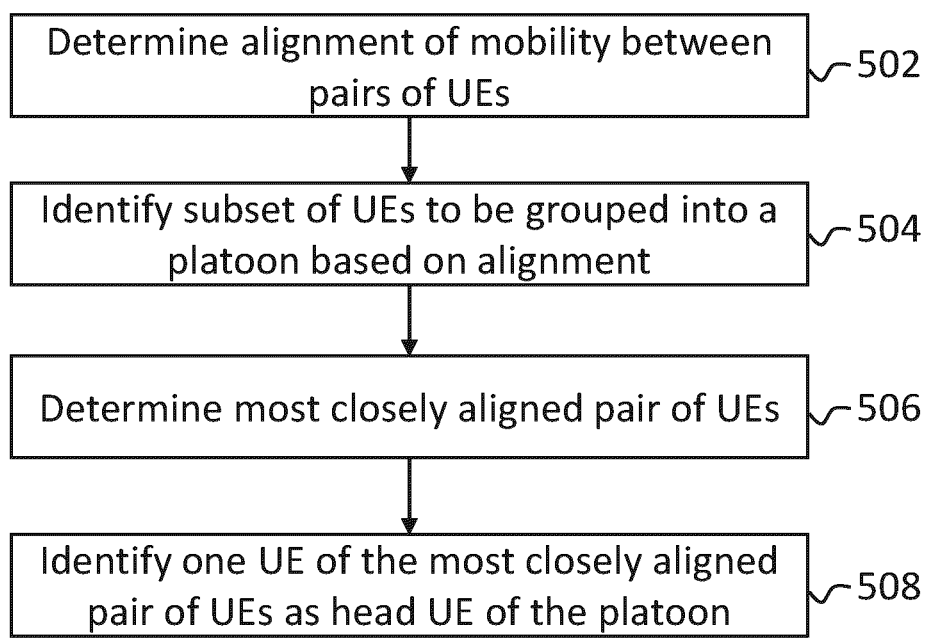
FIG. 5 illustrates a method according to embodiments of the present disclosure.

FIG. 5 illustrates a method for determining an indication of the subset of the plurality of UEs 108 to be grouped into a platoon.

At step 502, an alignment in mobility is determined between pairs of the plurality of UEs 108.

At step 504, based on the determined alignments, the subset of UEs most closely aligned are grouped into the platoon.

To determine the head UE of the platoon, at step 506, a determination is made as to the most closely aligned of the pairs of UEs 108 determined at step 502. The head UE is then chosen at step 508 to be one of the most closely aligned of the pairs of UEs 108 (determined at step 506). This may be a random selection or some other selection criteria. For example, the UE of the pair of UEs 108 having the highest signal strength may be chosen. For example, the UE of the pair of UEs 108 having the highest handshake frequency, such as the highest Transmission Control Protocol (TCP) handshake frequency, may be chosen.

Figure 6:
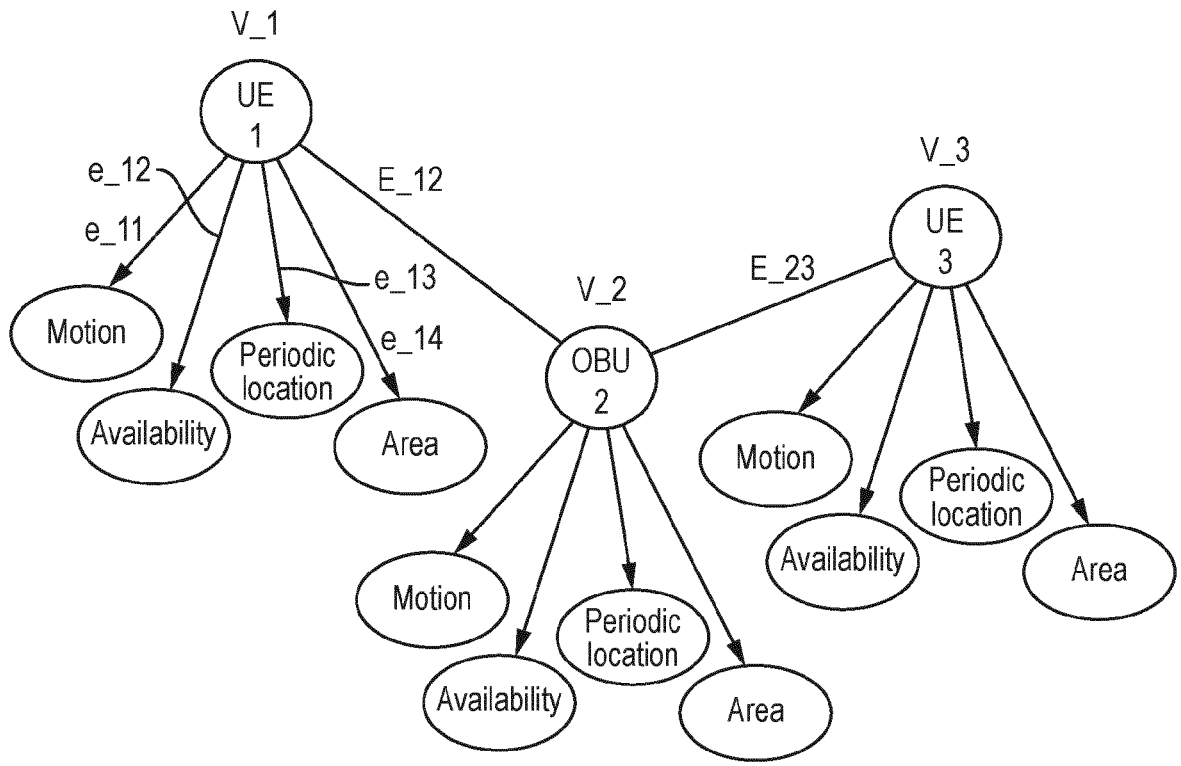
FIG. 6 is a diagram of a knowledge graph which may be generated by the method illustrated in FIGS. 4 and 5.

In some embodiments, to determine an alignment of mobility of the UEs 108, the method may utilise a network in a knowledge graph. For example, as shown in FIG. 6, the plurality of UEs 108 may be expressed by a knowledge graph G, with every vertex V representing a UE 108, and that UE's 108 respective mobility information (availability, motion, periodic location, and area information) aggregated as the different entities e weighting it's respective vertex V. For example, mobility information may weight an edge connecting a respective vertex. For example, the mobility vertex may include a Boolean value representing the presence of a communication device in a geographical region.

For example, an edge may be encoded with one or more temporal features, such as a periodic location or a lifetime of the presence of the respective communication device.

The respective UE locations may be modelled as an alignment edge E connecting vertex V. This information may be retrieved from the AMF 204. A graph representation G(V,E) may then be generated for each UE 108 having a respective alignment edge E and a respective vertex V as inputs.

Figure 7:
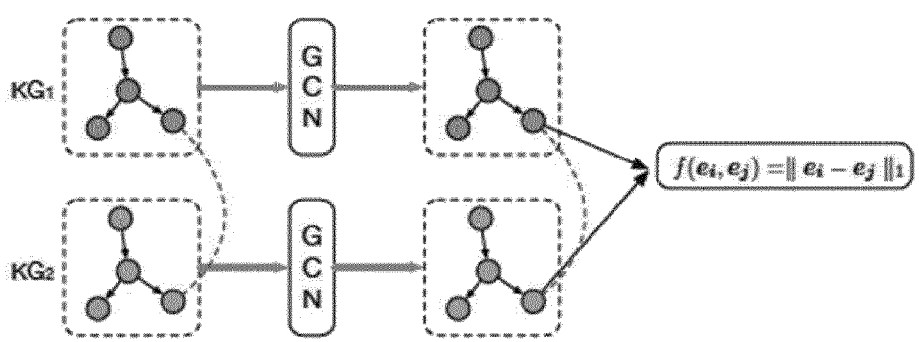
FIG. 7 is a block diagram illustrating an example cross-domain network alignment of two communication devices according to embodiments of the present disclosure.

A Graph Convolution network (GCN) may then be used to predict a subset of the UEs 108 to be platooned. FIG. 7 is an algorithmic block diagram illustrating an example cross-domain network alignment of two UEs 108 using two GCNs. In this example, two GCNs are provided to encode two knowledge graphs kG1, kG2 into a vector f(ei, ej).

The embedded weights may be optimised using the following loss function $L_a$:

$$L_a = \sum_{(e,v) \in G_1} \sum_{(e',v') \in G_2} [f(h_a(e), h_a(v)) + \gamma_a - f(h_a(e'), h_a(v'))]_+$$

Where (e, v) denotes a possible match (e.g. two UEs 108 in same cell area); (e', v') denotes an impossible matching (e.g. two UEs 108 in different cell areas); $\gamma_a$ is the hyperparameter which may be user defined or predetermined (e.g. tuned by an expert). f (x, y) is the L1 norm; and $h_a$ (·) denotes the attributed embedding of an entity.

To predict a possible mobility between two UEs 108, with its embedding, one can use the distance measurement of:

$$D(e_i, v_j) = (1 - \beta) \frac{f(h_a(e_i), h_a(v_j))}{d_a}$$

Where $d_a$ is the dimensionality of the attribute embedding $h_a$ (·) of the entities $e_i$, $v_j$ of respective knowledge graphs G1, G2, and $\beta$ is the hyper-parameter which may be user defined or predetermined (e.g. tuned by an expert). If $D(e_i, v_j)$ is smaller than a predetermined threshold distance, it may be determined that there exists an alignment or match between the entities $e_i$, $v_j$. As such, it may be determined that the two UEs 108 to which the graphs relate should be grouped into the platoon.

Referring again to FIG. 5, at step 506, the most closely aligned pair of UEs may be determined to identify one of the UEs 108 as the head UE. The measurement of the closeness of alignment may be the vextex pair having the minimal distance function $D(e_i, v_j)$.

In a variation of the above, cosine similarity thresholding with KG entities' encoding may be used to calculate the distance measurement, based on the cosine value of $h_a(e_i)$, $h_a(v_j)$.

it will be appreciated that the 'head UE' may not be the geographically leading UE in the platoon, since the determination is based on alignment of several mobility features.

As noted above, the lifetime of the platoon may be estimated from the periodic location and area information. In some embodiments, the lifetime of the platoon is estimated from the intersection of the periodic availability of all vertex with in the network. Alternatively, the lifetime may be estimated using recurrent neural network prediction, which may operate by training a neural network with snapshots of graph representations as inputs.

As mentioned above with reference to FIG. 4, once the PAF 208 has determined the platoon recommendation, at step 406 the platoon recommendation is reported or transmitted to a second network function, such as the AMF 204 or LMF 206. This second network function may then be responsible for implementing a platooning scheme for the subset of UEs 108 via the N2 interface based on the platoon recommendation. In a variation of this, the PAF 208 may be responsible for implementing the platooning scheme.

Figure 8:
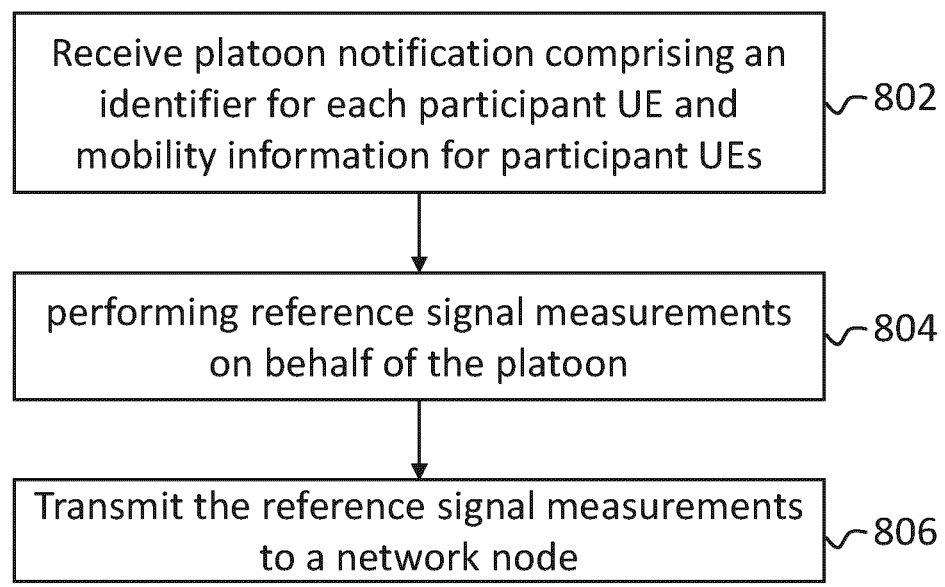
FIG. 8 illustrates a method according to embodiments of the present disclosure.

FIG. 8 illustrates a method, which may be implemented by a head UE of the UEs 108 (or communication devices), reporting reference signal measurements on behalf of a platoon. The platoon comprises the subset of UEs referred to above, including the head UE and one or more participant UEs. The subset of UEs included in the platoon may be indicated by a platoon notification issued by a network function, such as the AMF 204 or the LMF 206 or the PAF 208 described above.

At step 802, the head UE receives a platoon notification comprising an identifier for each of the participant UEs recommended for the platoon. The identifier may be a unique identifier, such as an international mobile subscriber identity (IMSI) number for identifying each of the participant UEs.

The platoon notification may further comprise mobility information for the participant UEs. Such information may comprise an availability of one or more of the participant UEs, for example for participating in a platoon. Such information may comprise motion information for one or more of the participant UEs, for example an indication of the direction and speed of travel of one or more of the participant UEs. Such information may comprise location information for one or more of the participant UEs. Such information may comprise serving area information denoting a serving or cell area in which one or more of the participant UEs is located. Such information may comprise platoon lifetime(s) which may define an estimated time for which one or more of the participant UEs is likely to be recommended for the platoon. For example, an estimate may be made as to a time at which a participant UE is likely to enter a different cell area and the platoon lifetime for that participant UE may be based on that estimate. By analysing the dynamics of UEs in the platoon, for example from measurements received from the head-UE, the trajectory of the platoon can be estimated to obtain the platoon lifetime. The platoon lifetime for the participant UEs may be used for the provisioning of base stations with the resources required for handover, since such handovers may result in a surge of load on resources at base stations involved in the handover of the platoon (collectively) in addition to individual UEs moving in and out of the platoon.

At step 804, the head UE may perform reference signal measurements on behalf of the platoon. As noted above, reporting reference signal measurements on behalf of the platoon reduces the energy used by the participant UEs and further reduces the bandwidth taken up by reference signal measurement reporting. The reference signal measurements may comprise CS measurements as discussed above.

Figure 9:
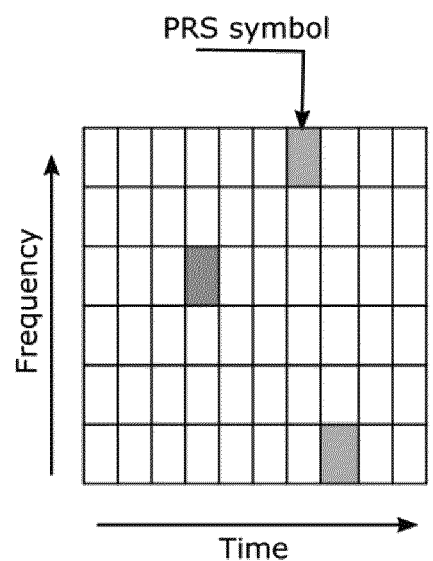
FIG. 9 is a diagram illustrating a positional reference signal.
Figure 10:
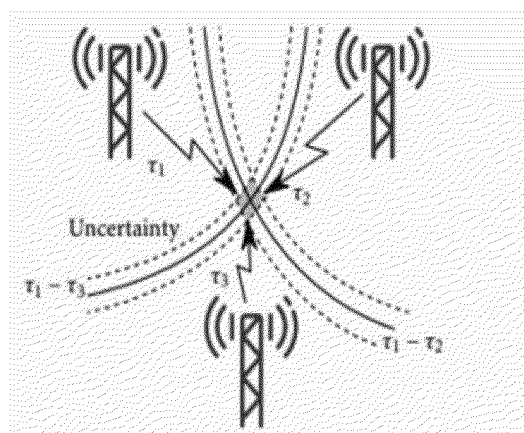
FIG. 10 is a diagram illustrating observed time difference of arrival.

In some embodiments, the reference signal measurements may additionally or alternatively comprise distance measurements representing distances between the head UE and one or more of the participant UEs. For example, to obtain a distance measurement between the head UE and a participant UE, the head UE may obtain a position of the subject participant UE. The position may be obtained from a base station 106 or from the core network 102 (e.g. from the LMF 206). The position may be obtained from the subject participant UE itself, for example via a PC5 interface. In some embodiments, the position is calculated by the UE from one or more downlink positional reference signals as shown in FIG. 9. The head UE compute these measurements from a serving base station and multiple neighbouring base stations of 104. The measurements may be reported to an Enhanced Serving Mobile Location Center (E-SMLC) of the serving base station 104. The position of the participant UE may then be estimated from these measurements using observed time distance of arrival (OTDOA) or similar triangulation techniques know in the art as depicted in FIG. 10. By obtaining distance information from either the base station 106 or directly from the subject participant UE, traffic between the head UE and the participant UEs on the one hand and the core network 102 on the other hand, is reduced.

At step 806, the reference signal measurements which have been performed by the head UE are reported to a network node, such as the LMF 206 or the AMF 204.

Figure 11:
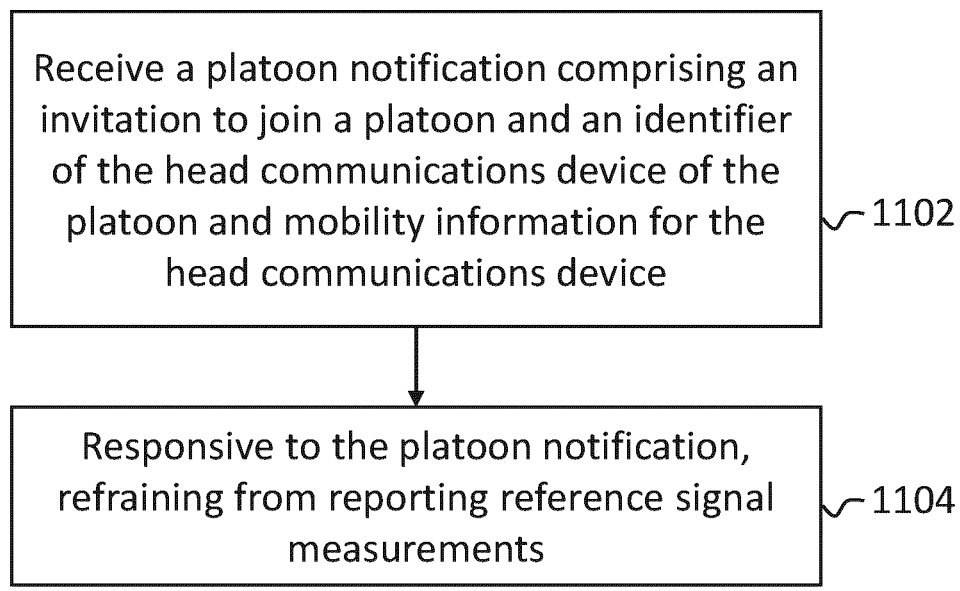
FIG. 11 illustrates a method according to embodiments of the present disclosure.

FIG. 11 illustrates a method which may be performed by one of the participant UEs described above with reference to FIG. 8. As noted above, embodiments of the present disclosure aim to reduce overall transmission of reference signal measurements (e.g. CS measurements) by allocating a head UE to make and report such measurements on behalf of a platoon. The method illustrated in FIG. 11 in relation to a participant UE aims to prevent the participant UEs from transmitting reference signal measurements that they would otherwise perform when they are incorporated into a platoon.

At step 1102, a platoon notification is received. The platoon notification may comprises an invitation to join the a platoon, which may comprise a head UE and one or more participant UEs. The platoon notification may comprise an identifier the head UE of the platoon. The identifier may be a unique identifier, such as an international mobile subscriber identity (IMSI) number for identifying each of the head UE. The platoon notification may further comprise mobility information for the head UE. Mobility information has been described in detail above and so will not be described in more detail here.

At step 1104, in response to the platoon notification, the participant UE may refrain from reporting reference signal measurements. For example, if the participant UE previously reporting reference signal measurements, the participant UE may cease or stop reporting reference signal measurements. For example, if the participant UE was previously not reporting reference signal measurements, the participant UE may continue to refrain. This may occur where the participant UE is handing off between two platoons based on receiving the platoon notification.

Optionally, the participant UE may, in response to the platoon notification, notify the LMF 206 or the base station 106 of its intention to refrain or continue too refrain from reporting reference signal measurements. For example, the notification to the LMF 206 from the participant UE may be an Radio Resource Control (RRC) signalling within to measurement reports configuration procedure. The notification to the LMF 206 may comprise an identifier for the participant UE and an identifier for the head UE. Additionally, the notification may comprise an estimated platoon lifetime for the participant UE.

It will be understood that conventionally, a service base station 106 typically collects information regarding UEs 108 based on asynchronous or periodic trigger events. In some embodiments of the present disclosure, once it is determined that a participant UE is part of a platoon, the serving base station 106 may only request measurement reporting from the head UE and not the participant UE. The base station 106 may be notified that a participant UE is participating in a platoon from the notification from the participant UE, either directly or indirectly (for example via the LMF 206).

Figure 12:
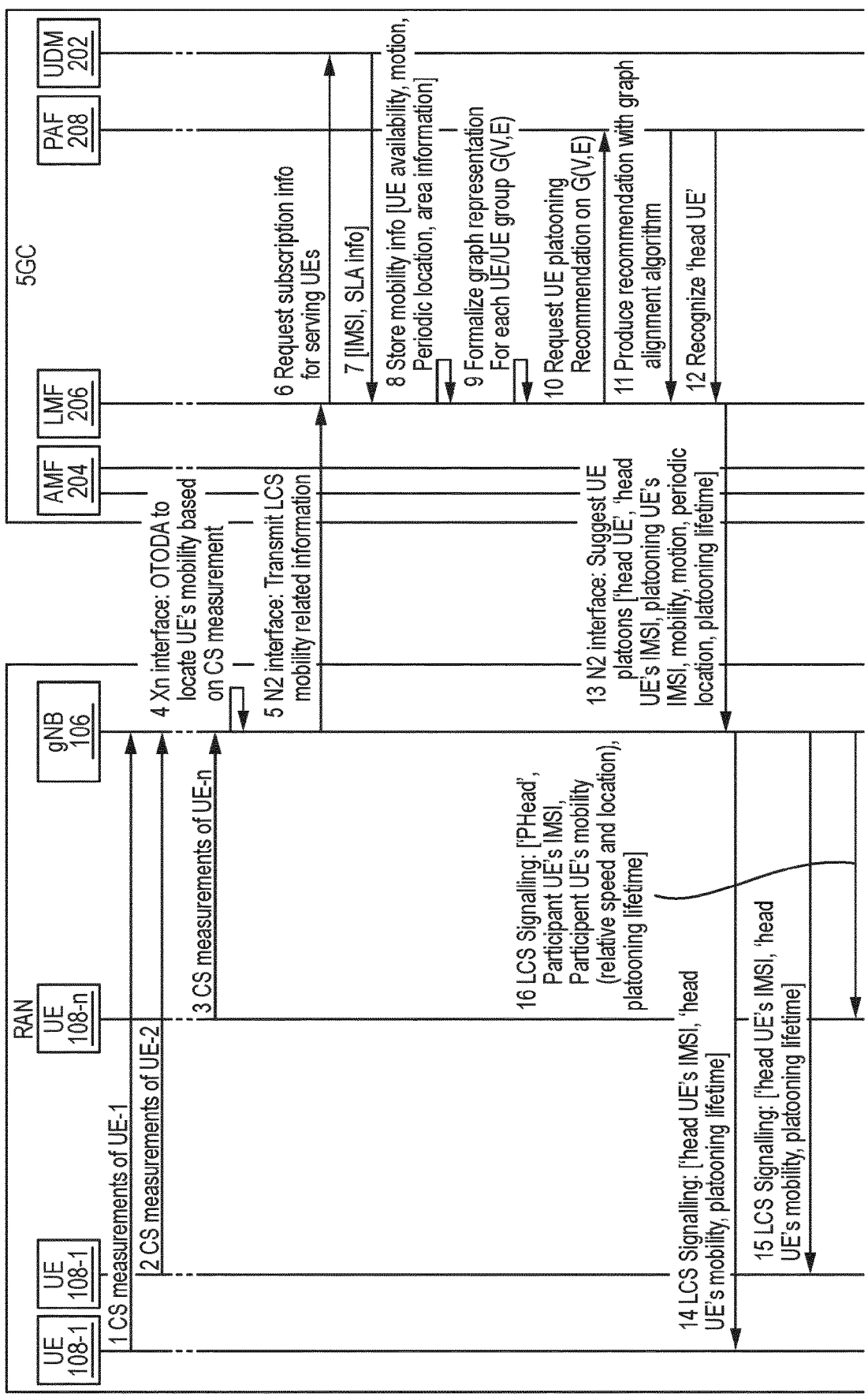
FIG. 12 is a signalling diagram illustrating an example of the method of FIGS. 4, 5 and 8.

FIG. 12 illustrates an example signalling diagram implementing the methods of FIGS. 4, 5, 8 and 11. In this example, the network functions of the 5G core network perform various steps in order to implement the methods described. It will be appreciated, the different network functions may be utilised to implement the method, and that alternative signalling may be used.

In steps 1 to 3, CS measurements from the plurality of UEs 108 are provided to the serving base station (gNB) 106.

At step 4, the gNB 106 uses OTODA to locate each of the UEs' 108 mobility base on the CS measurements and this mobility information is stored at the gNB 106.

At step 5, the gNB 106 transmits LCS information for each of the UEs 108 to the LMF 206 via the N2 interface.

At step 6, upon receiving the LCS information, the LMF 206 may request subscription information from the UDM 202.

At step 7, the UDM may return the requesting subscription information to the LMF 206, which may include an identifier for each of the UEs 108 (e.g. an IMSI) and service level agreement (SLA) information.

At step 8, the LMF 206 may store the LCS information, which may include UE availability, motion, periodic location, and area information (e.g. service area) for the UEs 108.

At step 9, the LMF 206 may generate a formalised graph representation G(V,E) based on the extracted LC information for each of the UEs 108 or UE groups, as described above in more detail.

At step 10, the LMF 206 may request a platoon recommendation from the PAF 208 based on the UE groups G(V,E). The request may include the formalised graph representation G(V,E). In other embodiments, instead of generating the formalised graph representation at the LMF 206, the LMF 206 may send the mobility information to the PAF 208 and the graph representation(s) formalised by the PAF 208.

At step 11, the PAF 208 may produces a platoon recommendation with a graph alignment algorithm such as that described above with reference to FIGS. 4 and 5. The platoon recommendation may identify one or more of the UEs 108-1:108-n to form a platoon.

At step 12 The PAF 208 may send to the LMF 206 a recommendation of a head UE of the one or more UEs 108 identified at step 11, the head UE to report reference signal measurements (such as CS measurements) on behalf of the platoon. In some embodiments, this step is combined with step 11. For example, the head UE recommendation may form part of the platoon recommendation.

At step 13, the LMF 206 may send a UE platoon recommendation to the gNB 106 via the N2 interface. The UE platoon recommendation may include one or more of an identifier for the head UE, an identifier for each of the UEs 108 identified to join the platoon (participant UEs), and mobility, motion, periodic location information for the participant UEs as well as a platoon lifetime.

In the example method, the nth UE 108-n is identified as the head UE of the platoon and first UE 108-1 and second UE 108-2 are identified as participant UEs.

As such, at steps 14 and 15, the gNB 106 may send a platoon notification using LCS signalling to each of the first and second UEs 108-1, 108-2. The platoon notification may comprise one or more of an identifier for the head UE 108-n, mobility information for the head UE 108-n and a platoon lifetime estimate.

At step 16, the gNB 106 may send a platoon notification using LCS signalling to the nth UE 108-*n* (the head UE). This platoon notification may comprise an identifier for each participant UE identified for the platoon (i.e. UEs 108-1, 108-2), mobility information for the head UE 108-*n* and a platoon lifetime estimate. It will be appreciated that steps 14 to 16 may be performed substantially at the same time.

Figure 13:
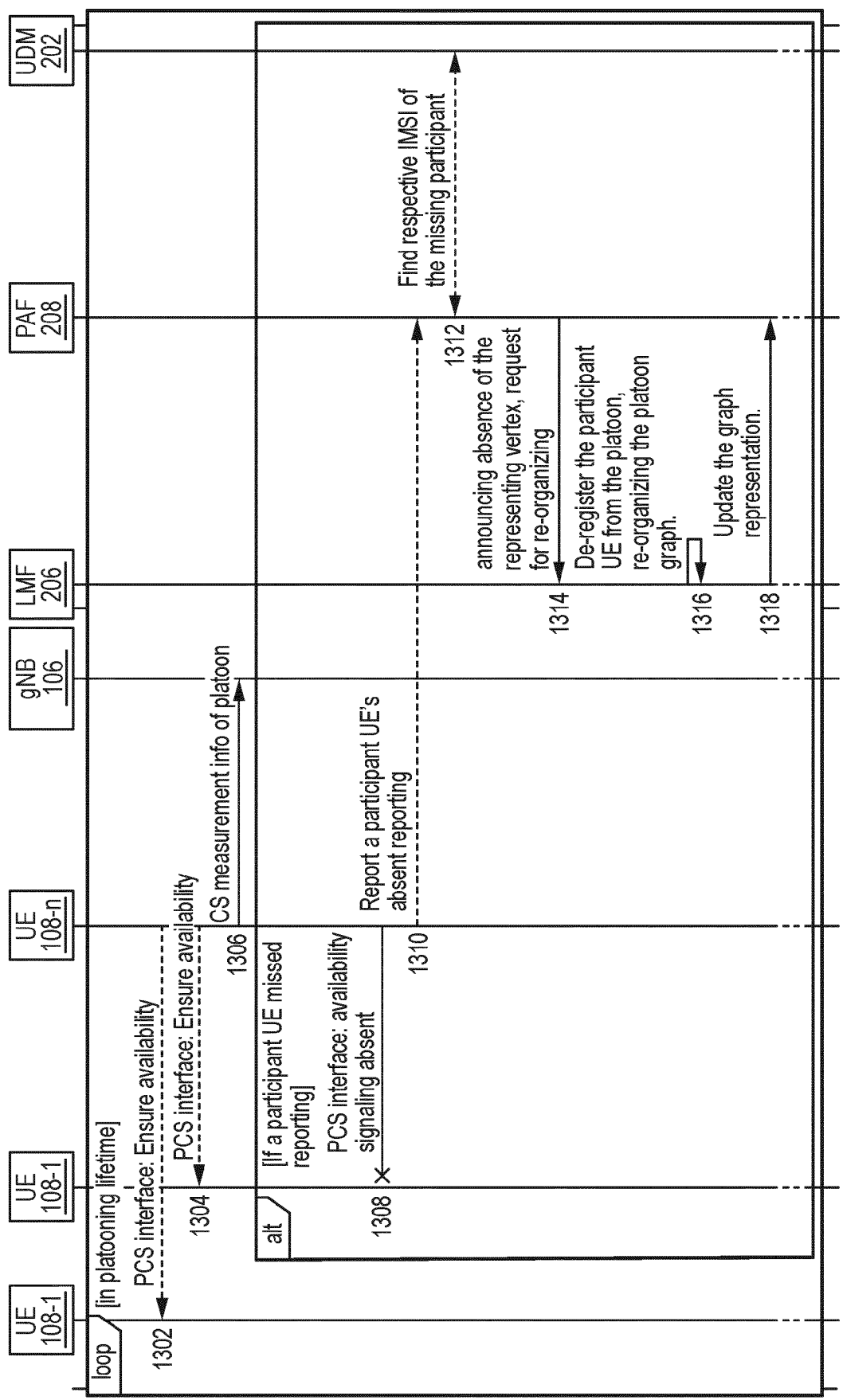
FIG. 13 is a signalling diagram illustrating an example of the method of FIGS. 8 and 11.

FIG. 13 illustrates an example a signalling diagram following on from that shown in FIG. 12. Like FIG. 12, the network functions of the 5G core network perform various steps in order to implement the methods described. It will be appreciated, the different network functions may be utilised to implement the method, and that alternative signalling may be used.

As noted above, a platoon lifetime is sent to each of the UEs 108 from the gNB 106 at steps 14 to 16.

At steps 1302, 1304, during the lifetime of the platoon as defined by the platoon lifetime indication, the head UE 108-*n* may confirm with each of the participant UEs 108-1, 108-2 their availability to participate in the platoon. This confirmation may be performed by way of direct communication between the head UE 108-*n* and the participant UEs 108-1, 108-2. For example, communication may be via a PC5 interface or the like.

At step 1306, the head UE 108-*n* reports reference signal measurements on behalf of the platoon to the gNB 106 as describe above with reference to FIG. 8.

If at step 1308, it is determined by the head UE 108-*n* that a participant UE 108-2 has not responded at steps 1304 or 1306 to confirm their availability, then at step 1310, the head UE 108-*n* may report the absence of the participant UE 108-2 to the PAF 208.

In response to receiving the report at step 1308 from the head UE 108-*n*, at step 1312, the PAF 208 may request the identifier of the participant UE 108-2 that has become unavailable from the UDM 202.

At step 1314, the PAF 208 may then indicate or announce to the LMF 206 the absence of a vertex in the representation and request re-organisation of the associated graph representation G(V,E).

At step 1316, the LMF 206 may then de-register the participant UE 108-2 from the platoon and re-organise the graph representation G(V,E).

At step 1318, the LMF 206 may then send the updated graph representation G(V,E) to the PAF 208 which may then generate an updated platoon recommendation in a manner similar to that describe at steps 11 and 12 in FIG. 12.

Steps 1302 to 1318 may be repeated until the end of the platoon lifetime.

Figure 14:
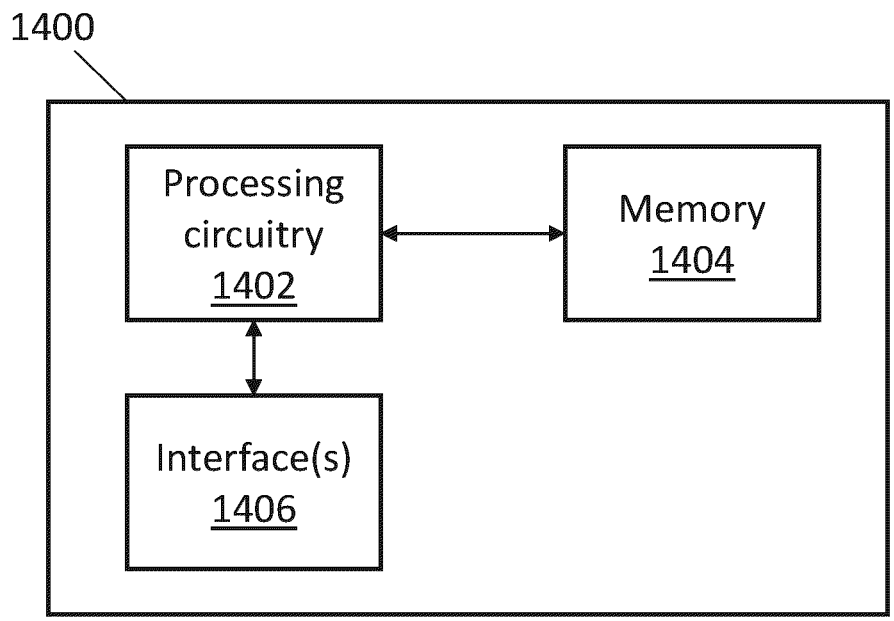
FIGS. 14 to 19 are schematic diagrams of apparatus according to embodiments of the present disclosure.

FIG. 14 is a schematic diagram of an apparatus 1400 according to embodiments of the disclosure. The apparatus 1400 may perform the method described above with respect to FIGS. 4 and 5. The apparatus 1400 may correspond to or be implemented within the core network 102 described above.

The apparatus 1400 comprises processing circuitry 1402 (such as one or more processors, digital signal processors, general purpose processing units, etc), a computer-readable medium (e.g., memory such as read-only memory (ROM), random-access memory, cache memory, flash memory devices, optical storage devices, etc) 1404 and one or more interfaces 1406. The interfaces 1406 may comprise one or more interface circuits supporting wired or wireless communications according to one or more communication protocols. The interfaces 1406 may support exchange of messages in accordance with examples of the methods disclosed herein. In one example, the interfaces 1406 may comprise a fourth generation (4G) or 5G air interface or similar. The components are illustrated coupled together in series; however, those skilled in the art will appreciate that the components may be coupled together in any suitable manner (e.g., via a system bus or suchlike).

According to embodiments of the disclosure, the computer-readable medium 1404 stores instructions which, when executed by the processing circuitry 1402, cause the apparatus 1400 to: obtain mobility information for a plurality of communication devices; determine, based on the mobility information, a platoon recommendation comprising a subset of the plurality of communication devices to be grouped into a platoon and a head communication device of the subset of communication devices to be responsible for reporting reference signal measurements on behalf of the platoon; and transmitting the platoon recommendation to a second network function.

In further embodiments of the disclosure, the apparatus 1400 may comprise power circuitry (not illustrated). The power circuitry may comprise, or be coupled to, power management circuitry and is configured to supply the components of apparatus 1400 with power for performing the functionality described herein. Power circuitry may receive power from a power source. The power source and/or power circuitry may be configured to provide power to the various components of apparatus 1400 in a form suitable for the respective components (e.g., at a voltage and current level needed for each respective component). The power source may either be included in, or external to, the power circuitry and/or the apparatus 1400. For example, the apparatus 1400 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 15:
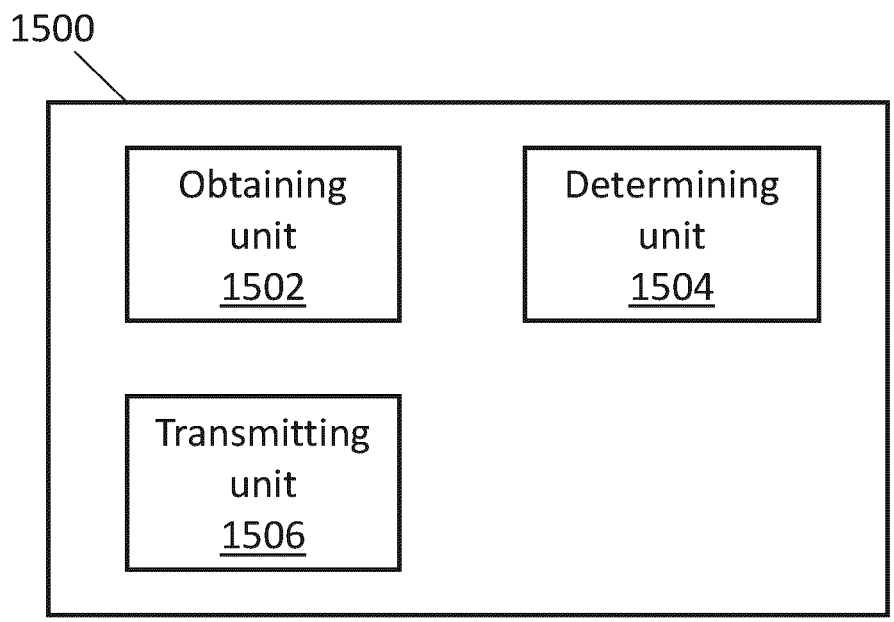

FIG. 15 is a schematic diagram of an apparatus 1500 according to further embodiments of the disclosure. The apparatus 1500 may perform the method described above with respect to FIG. 8. The apparatus 1500 may correspond to or be implemented within one of the UEs (or communications devices) 108 described above.

The apparatus 1500 comprises an obtaining unit 1502, a determining unit 1504 and a transmitting unit 1506. The obtaining unit 1502 is configured to obtain mobility information for a plurality of communication devices. The determining unit 1504 is configured to determine, based on the mobility information, a platoon recommendation comprising a subset of the plurality of communication devices to be grouped into a platoon and a head communication device of the subset of communication devices to be responsible for reporting reference signal measurements on behalf of the platoon. The transmitting unit 1506 is configured to transmit the platoon recommendation to a second network function.

Figure 16:
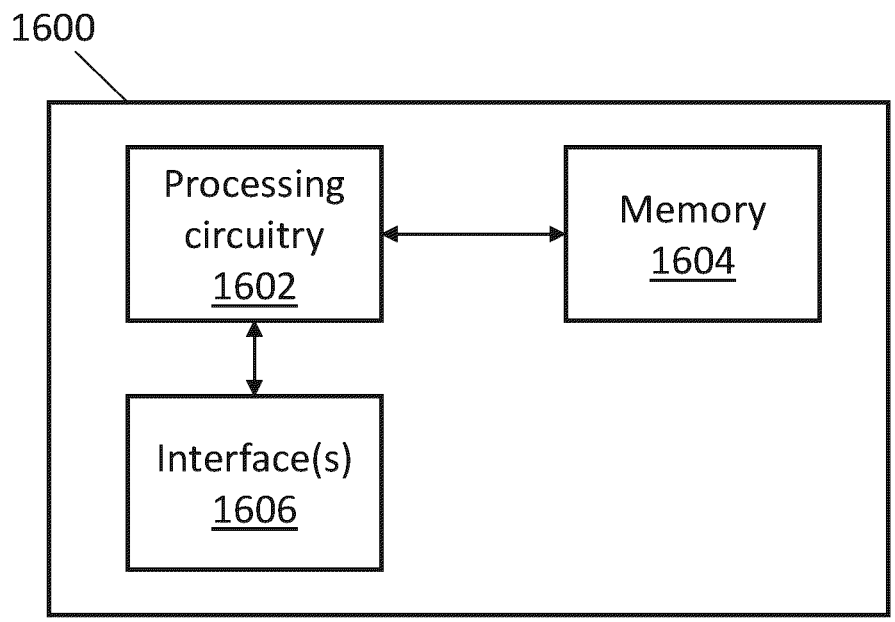

FIG. 16 is a schematic diagram of an apparatus 1600 according to embodiments of the disclosure. The apparatus 1600 may perform the method described above with respect to FIG. 8. The apparatus 1600 may correspond to or be implemented within one of the UEs (or communications devices) 108 described above.

The apparatus 1600 comprises processing circuitry 1602 (such as one or more processors, digital signal processors, general purpose processing units, etc), a computer-readable medium (e.g., memory such as read-only memory (ROM), random-access memory, cache memory, flash memory devices, optical storage devices, etc) 1604 and one or more interfaces 1606. The interfaces 1606 may comprise one or more interface circuits supporting wired or wireless communications according to one or more communication protocols. The interfaces 1606 may support exchange of messages in accordance with examples of the methods disclosed herein. In one example, the interfaces 1606 may comprise a 4G/5G air interface or similar. The components are illustrated coupled together in series; however, those skilled in the art will appreciate that the components may be coupled together in any suitable manner (e.g., via a system bus or suchlike).

According to embodiments of the disclosure, the computer-readable medium 1604 stores instructions which, when executed by the processing circuitry 1602, cause the apparatus 1600 to: receive at a communication device a platoon notification comprising an identifier for each of a plurality of participant communication devices and mobility information for the plurality of participant communication devices; perform reference signal measurements on behalf of the platoon; and report the reference signal measurements to a network node.

In further embodiments of the disclosure, the apparatus 1600 may comprise power circuitry (not illustrated). The power circuitry may comprise, or be coupled to, power management circuitry and is configured to supply the components of apparatus 1600 with power for performing the functionality described herein. Power circuitry may receive power from a power source. The power source and/or power circuitry may be configured to provide power to the various components of apparatus 1600 in a form suitable for the respective components (e.g., at a voltage and current level needed for each respective component). The power source may either be included in, or external to, the power circuitry and/or the apparatus 1600. For example, the apparatus 1600 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 17:
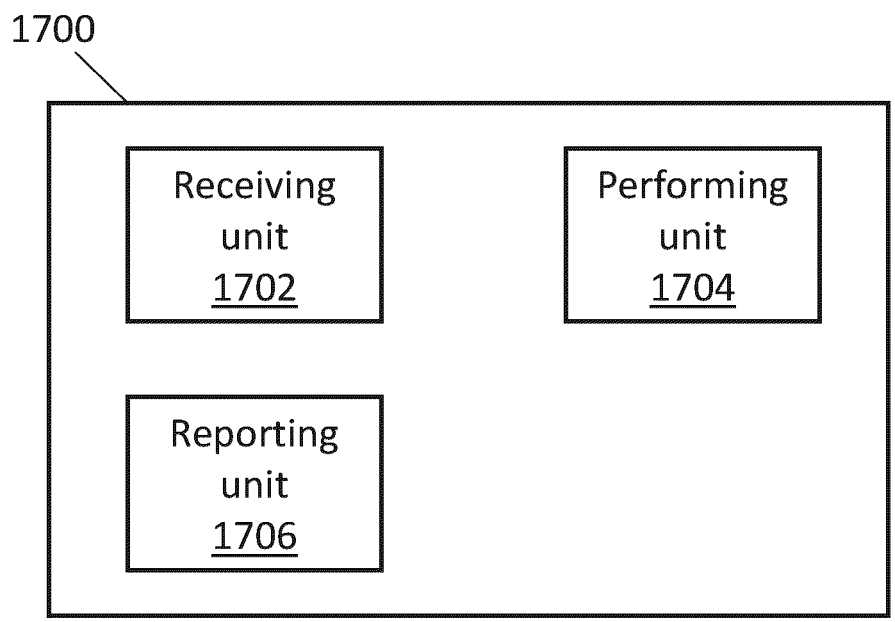

FIG. 17 is a schematic diagram of an apparatus 1700 according to further embodiments of the disclosure. The apparatus 1700 may perform the method described above with respect to FIG. 8. The apparatus 1700 may correspond to or be implemented within one of the UEs (or communications devices) 108 described above.

The apparatus 1700 comprises a receiving unit 1702, a performing unit 1704 and a reporting unit 1706. The receiving unit 1702 is configured to receive a platoon notification comprising an identifier for each of a plurality of participant communication devices and mobility information for the plurality of participant communication devices. The performing unit 1704 is configured to perform the reference signal measurements on behalf of the platoon. The reporting unit 1706 is configured to report the reference signal measurements to a network node.

Figure 18:
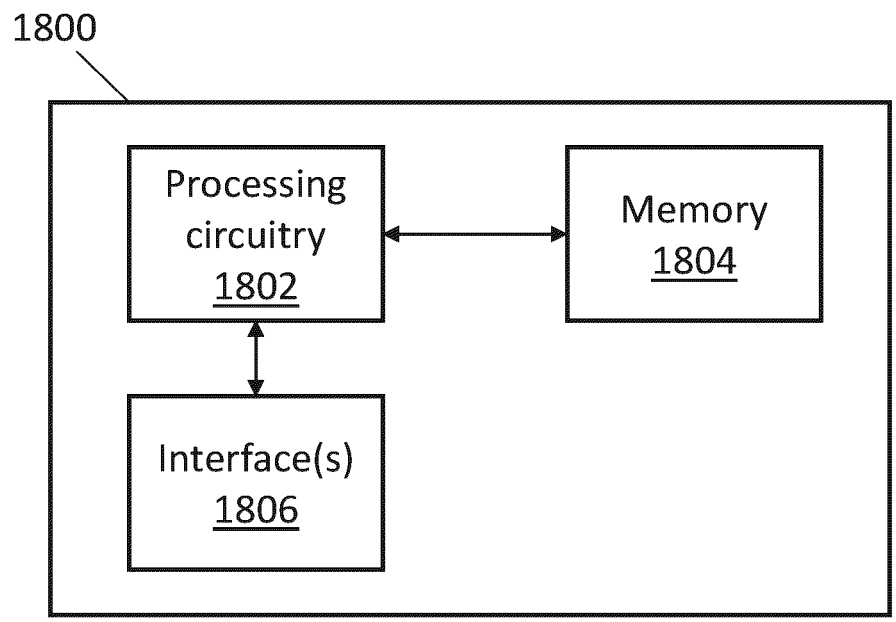

FIG. 18 is a schematic diagram of an apparatus 1800 according to embodiments of the disclosure. The apparatus 1800 may perform the method described above with respect to FIG. 11. The apparatus 1800 may correspond to or be implemented within one of the UEs (or communications devices) 108 described above.

The apparatus 1800 comprises processing circuitry 1802 (such as one or more processors, digital signal processors, general purpose processing units, etc), a computer-readable medium (e.g., memory such as read-only memory (ROM), random-access memory, cache memory, flash memory devices, optical storage devices, etc) 1804 and one or more interfaces 1806. The interfaces 1806 may comprise one or more interface circuits supporting wired or wireless communications according to one or more communication protocols. The interfaces 1806 may support exchange of messages in accordance with examples of the methods disclosed herein. In one example, the interfaces 1806 may comprise a 4G/5G air interface or similar. The components are illustrated coupled together in series; however, those skilled in the art will appreciate that the components may be coupled together in any suitable manner (e.g., via a system bus or suchlike).

According to embodiments of the disclosure, the computer-readable medium 1804 stores instructions which, when executed by the processing circuitry 1802, cause the apparatus 1800 to: receiving a platoon notification comprising: an invitation to join a platoon comprising the plurality of participant communication devices and a head communication device; and an identifier of the head communication device and mobility information for the head communication device; and responsive to the platoon notification, refraining from reporting reference signal measurements.

In further embodiments of the disclosure, the apparatus 1800 may comprise power circuitry (not illustrated). The power circuitry may comprise, or be coupled to, power management circuitry and is configured to supply the components of apparatus 1800 with power for performing the functionality described herein. Power circuitry may receive power from a power source. The power source and/or power circuitry may be configured to provide power to the various components of apparatus 1800 in a form suitable for the respective components (e.g., at a voltage and current level needed for each respective component). The power source may either be included in, or external to, the power circuitry and/or the apparatus 1800. For example, the apparatus 1800 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 19:
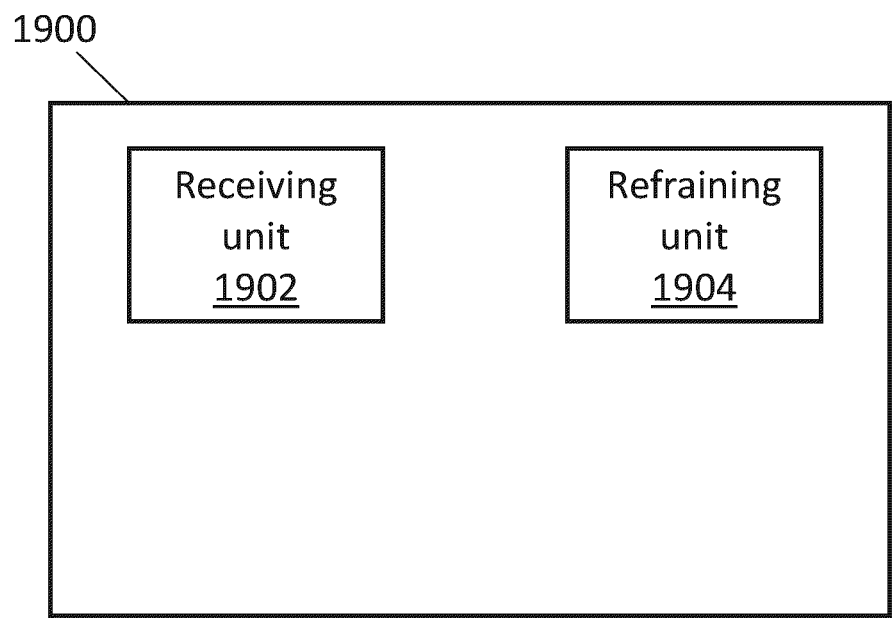

FIG. 19 is a schematic diagram of an apparatus 1900 according to further embodiments of the disclosure. The apparatus 1900 may perform the method described above with respect to FIG. 11. The apparatus 1900 may correspond to or be implemented within one of the UEs (or communications devices) 108 described above.

The apparatus 1900 comprises a receiving unit 1902 and a refraining unit 1904. The receiving unit 1902 is configured to receive a platoon notification. The platoon notification comprises an invitation to join a platoon comprising the plurality of participant communication devices and a head communication device, and an identifier of the head communication device and mobility information for the head communication device. The refraining unit 1904 is configured to, responsive to the platoon notification, refrain from reporting reference signal measurements.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The disclosure thus provides methods, apparatus and computer-readable media for selecting metrics to be monitored in a communication network. In particular, the method comprises receiving an indication of one or more mandatory metrics to be monitored, and then selecting additional metrics to be monitored taking into account the mandatory metrics.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A communication device for reporting reference signal measurements on behalf of a platoon comprising the communication device and a plurality of participant communication devices, the communication device comprising processing circuitry; and a memory coupled to the processing circuitry and comprising computer readable program instructions that, when executed by the processing circuitry, cause the communication device to:
receiving, from a network node, a platoon notification comprising an identifier for each of the plurality of participant communication devices and mobility information for the plurality of participant communication devices in the platoon, wherein the mobility information comprises at least one of:
availability of at least one participant communication device to participate in the platoon;
a serving area in which the at least one participant communication device is located;
a speed of travel of the at least one participant communication device;
a direction of travel of the at least one participant communication device; and
an estimated platoon lifetime during which the at least one participant communication device is recommended to be a participant of the platoon;
performing the reference signal measurements on behalf of the platoon; and
reporting the reference signal measurements to the network node.

2. The communication device of claim 1, wherein reporting the reference signal measurements comprises reporting a distance between the communication device and each of the participant communication devices.

3. The communication device of claim 2, further comprising determining the distance between the communication device and each of the participant communication devices.

4. The communication device of claim 3, wherein determining the distance between the communication device and each of the participant communication devices comprises:
obtaining a position of each of the participant communication devices; and
determining the distance based on the position of the communication device and the respective position of each of the participant communication devices.

5. The communication device of claim 4, wherein the position of each of the participant communication devices is received from one or more base stations.

6. The communication device of claim 4, wherein the position of each of the participant communication devices is received directly from each of the participant communication devices.

7. The communication device of claim 1, wherein the platoon notification comprises a request for the communication device to report the reference signal measurements.

8. The communication device of claim 1, further comprising:
monitoring an availability status of each of the participant communication devices in the platoon through direct communication with each of the participant communication devices.

9. The communication device of claim 8, further comprising:
on determining that one or more of the participant communication devices is unavailable based on the availability status, transmitting a deregistration signal to deregister the one or more of the participant communication devices from the platoon.

10. The communication device of claim 9, further comprising:

receiving an updated platoon notification in response to deregistration of the one or more of the participant communication devices from the platoon.

11. The communication device of claim 1, wherein the platoon notification further comprises a platoon lifetime, wherein the method is performed over the platoon lifetime.

12. The communication device of claim 1, wherein:
the platoon notification received from the network node comprises a request for the communication device to report the reference signal measurements on behalf of the platoon, and
the communication device operates as a head User Equipment for performing the reference signal measurements on behalf of the plurality of participant communication devices in the platoon.

* * * * *